United States Patent Office 3,126,359
Patented Mar. 24, 1964

3,126,359
PROCESS FOR THE POLYMERIZATION OF FORMALDEHYDE
Klaus Weissermel and Hans Dieter Hermann, Frankfurt am Main, Germany, assignors to Farbwerke Hoechst Aktiengesellschaft vormals Meister Lucius & Brüning, Frankfurt am Main, Germany, a corporation of Germany
No Drawing. Filed Nov. 30, 1959, Ser. No. 855,974
Claims priority, application Germany Dec. 2, 1958
7 Claims. (Cl. 260—67)

The present process relates to an invention for the polymerization of formaldehyde.

It has already been proposed to polymerize formaldehyde in inert organic solvents in the presence of acid or basic catalysts, such as inorganic acids, boron trichloride or amines. The polymers prepared in the presence of acid catalysts are so brittle and unstable that they are not suited for further processing. When using amines as catalysts, preferably tertiary or secondary aliphatic amines, it is possible to produce polymers which, due to their superior plastic-elastic properties, can be processed into molded structures, fibers, sheets and films, however, the capacity of the polymers or the shaped articles made therefrom to resist the high working temperatures used is insufficient, which precludes their practical application.

Now we have found that boric acid tris-amides of the general formula $B(NR_1R_2)_3$ exhibit a higher catalytic action for the polymerization of formaldehyde then the known catalysts and that with the aid of these catalysts stable, tough formaldehyde polymers can be produced exhibiting a better thermal stability than the polymers obtainable from exactly the same starting products in the presence of the known basic catalysts under uniform reaction conditions (cf. the statements made in the examples). In the aforementioned general formula, $R_1$ and $R_2$ represent the same or different, monovalent, saturated or unsaturated, linear or branched aliphatic, cycloaliphatic hydrocarbon radicals or monovalent aromatic hydrocarbon radicals, which radicals may also participate in bivalent form as structural units in the formation of the nucleus of a nitrogen-containing heterocyclic radical. The radicals may contain substituents, such as nitro- or alkoxy groups. As heterocyclic radicals those nitrogen-containing heterocyclic compounds are suited of which the hydrogen atom attached to the nitrogen is so acid that it can react with metallo-organic compounds, for example Grignard compounds.

The following boric acid tris-amides, for example, can be prepared from secondary aliphatic amines, of which each alkyl radical contains advantageously 1 to 20 carbon atoms, primary or secondary aromatic amines, heterocyclic compounds, such as pyrrolidine or heterocyclic compounds of the carbazole series:

Boric acid tris-dimethylamide, boric acid tris-diethylamide, boric acid tris-diisopropylamine, boric acid tris-dibutylamide, boric acid tris-N-methyl-ethyl-amide, boric acid tris-N-methyl-propyl-amide, boric acid tris-N-methyl-stearyl-amide, boric acid tris-methylanilide, boric acid tris-ethylanilide, boric acid tris-α-naphthyl-N-methyl-amide, boric acid tris-β-naphthyl-N-methyl-amide, boric acid tris-pyrrolidide, boric acid tris-N-carbazolide.

The boric acid tris-amides are readily accessible, colorless liquids or readily crystallizing compounds. The boric acid tris-amides applied according to the present invention can be prepared in known manner, for example by combining 3 moles, for example of a secondary cycloaliphatic, aromatic or a secondary heterocyclic amine with one mole of an addition compound of boron trifluoride with ether and an equivalent number of moles of any Grignard or alkali-organic compound, such as $C_2H_5MbBr$ or $CH_3Li$ and by isolating and purifying the reaction products according to the usual organo-chemical methods, for example by distillation or crystallization. In the course of the reaction, there may be converted one or several amines (in the molar ratio as stated above) with an addition compound of boron trifluoride with ether to boric acid tris-amides, containing the same or different amine radicals.

As regards the properties of these compounds, it may be generally stated that they are more stable to hydrolysis than the boric acid esters. The stability of the boric acid tris-amides to hydrolysis and alcoholysis is largely dependent on the structure and the nature of the tris-amides. They are, furthermore, readily soluble in inert organic solvents, such as dialkyl ethers, inner ethers, aliphatic or cycloaliphatic hydrocarbons, aromatic hydrocarbons and halogenated aliphatic and aromatic hydrocarbons. They may be applied as such or in combination with other catalysts, for example with the secondary or tertiary aliphatic amines known for the polymerization of formaldehyde. Depending on the choice of the reaction conditions, the catalyst may be applied in undissolved form, but preferably in dissolved form. It is expedient to dissolve the catalyst or the catalyst mixture in the same inert organic solvent in which the polymerization of the formaldehyde is carried out.

The amount of the catalyst added varies between 0.0001 and 0.1 mole percent, preferably 0.001 and 0.01 mole percent, per mole of the monomeric formaldehyde applied, said upper and lower concentration limits constituting values which depend to a certain extent on the degree of purity of the monomer and the catalytic efficiency of the boric acid tris-amide added.

The polymerization conditions can be chosen such that pure formaldehyde is introduced continuously according to the rhythm of the polymerization—that is to say, the subsequent portion of formaldehyde is only supplied when the previously added portion has been used up by the polymerization—into an inert organic solvent which simultaneously contains the catalyst, preferably in dissolved form. The aforesaid pure formaldehyde has a water content of <0.1% by weight, preferably <0.05% by weight, and can be prepared according to known methods, for example from para-formaldehyde, α-polyoxymethylene, semi-formals or trioxane. It is sometimes advantageous to initiate the reaction with a small amount, for example one-tenth, of the catalyst or the catalyst solution, and to add the remainder discontinuously or continuously as the polymerization progresses.

As inert organic solvents there are suited dialkyl ethers, such as diethyl ether, inner ethers, such as tetrahydrofurane or dioxane, furthermore aliphatic hydrocarbons containing about 3 to 10 hydrocarbon atoms or mixtures thereof, cycloaliphatic hydrocarbons, such as cyclohexane, aromatic hydrocarbons, such as benzene, or alkylated benzenes, such as toluene, ethyl benzene or the various xylenes: furthermore halogenated aliphatic hydrocarbons, such as dichloromethane, and halogenated aromatic substances, such as chlorobenzene. The solvents mentioned must be free from impurities which influence the course of the polymerization such as, for example, water, alcohol, or carboxylic acids, and shall wholly or partially dissolve the catalyst applied.

The quantity of the solvent applied may vary within wide limits. However, it is expedient to apply the solvent in at least double the amount by weight of the resulting polymer. The amount of solvent applied in each individual case depends essentially on the polymerization conditions chosen and on economic points of view. As a rule, it is not expedient to apply more than 50 times the amount of solvent, calculated on the polymer. The polymerization is carried out in the absence of oxygen and with agitation in order to attain a thorough mixing of the polymer dispersion obtained.

The polymerization temperature applied may also vary within wide limits. Suitably the operation is carried out at a temperature within the range of about $-20°$ C. to $+60°$ C., preferably about $0°$ C. to $+40°$. The polymerization may be effected discontinuously or continuously in reaction vessels customarily used for polymerization reactions.

The polymers prepared according to the process of the present invention can be processed into diverse products by the known methods, for example into shaped structures according to the injection molding technique. After the incorporation of 0.1 to 5% by weight of carboxylic acid amides, as described in British patent application No. 37341/59, the polymers prepared according to the invention can be pressure-molded into tough, colorless and transparent sheets which, even after prolonged storage, do not become brittle and do not undergo discoloration.

The loss in weight of the polymers stabilized by the dicarboxylic acid amides described in British patent application No. 37341/59 was <0.5% by weight, in most cases, however, <0.2% by weight per minute at $200°$ C.

The following examples serve to illustrate the invention but they are not intended to limit it thereto:

*Example 1*

100 grams of a commercial paraformaldehyde are suspended in 250 ml. of a mixture of aliphatic hydrocarbons boiling at a temperature within the range of $210°$ C. to $250°$ C. and are thermally decomposed while stirring and passing through a current of nitrogen. The gaseous formaldehyde formed, which is discharged together with the current of nitrogen, is passed for purification through a vertical glass tube, the upper half of which is filled with inert fillers and which is cooled to $-15°$ C. Then the formaldehyde is introduced into a reaction vessel containing 500 ml. of a mixture of aliphatic hydrocarbons boiling at a temperature within the range of $210°$ C. to $250°$ C. and 0.013 mole percent of boric acid tris-diethylamide. The polymerization medium is stirred vigorously and maintained at a temperature of $25°$ C. by cooling. The monomeric formaldehyde polymerizes instantaneously at the rate at which it is metered into the reaction medium, with the formation of white polymer particles. Said particles are filtered off, washed with cyclohexane, and dried. A product is obtained sustaining, under nitrogen, a loss in weight of 33% at a temperature of $200°$ C. within 30 minutes.

For purposes of comparison, formaldehyde is prepared in the same manner by decomposing para formaldehyde, subsequently purified and polymerized. Instead of the boric acid tris-amide, 0.017 mole percent of tributylamine, calculated on the formaldehyde, is employed as a polymerization catalyst. 43 grams of a polymer are obtained which sustains under nitrogen a loss in weight of 56% at $200°$ C. within 30 minutes, i.e. a substantially higher loss than the polymer prepared according to the invention.

*Example 2*

200 grams of a commercial paraformaldehyde are thermally decomposed at a temperature within the range of $140°$ C. to $150°$ C. The vapors formed are purified as indicated in Example 1. Then the monomeric current is divided and one half of the monomer is passed into a polymerization vessel containing 500 ml. of a mixture of aliphatic hydrocarbons, boiling at a temperature within the range of $210°$ C. to $250°$ C., and 0.0035 mole percent of boric acid tris-N-methylstearylamide. The other half of the monomeric formaldehyde is introduced into a second vessel containing the same amount of the same solvent but, as a catalyst, 0.011 mole percent of N-methyl-N-stearylamine. The contents of both vessels are stirred vigorously and maintained by cooling at a temperature of $20°$ C. The polymers formed are filtered off, washed with cyclohexane and dried. The polymer obtained in the presence of boric acid amide sustains under nitrogen a loss in weight of 34% at $200°$ C. within 30 minutes, while the product polymerized by means of N-methyl-N-stearylamine sustains a loss in weight of 69% under the same conditions.

*Example 3*

A gaseous formaldehyde obtained by thermal decomposition of 100 grams of a commercial paraformaldehyde is purified as indicated in Example 1 and introduced into a polymerization vessel in the course of two hours with the exclusion of atmospheric moisture and oxygen. The polymerization medium consists of 500 ml. of a highly purified-n-heptane containing as a polymerization catalyst 0.014 mole percent of boric acid tris-pyrrolidide, calculated on the formaldehyde. While vigorously stirring the polymerization batch, the formaldehyde polymerizes at the same rate at which it is metered into the polymerization medium which is maintained at a temperature of $25°$ C. The polymer is filtered off and washed. After drying, 48 grams of polyformaldehyde are obtained which are intimately mixed with 2% of malonic acid diamide by means of a rapid stirrer. The stabilized polymer sustains under nitrogen a loss in weight of 4.5% at $200°$ C. within 30 minutes.

We claim:
1. A process for the polymerization of formaldehyde, which comprises the step of polymerizing pure, monomeric, gaseous formaldehyde at a temperature within the range of about $-20°$ C. to about $60°$ C. in admixture with an inert organic solvent and 0.0001 to 0.1 mole percent per mole of monomeric formaldehyde, of a member selected from the group consisting of boric acid tris pyrrolidide, boric acid tris N-carbazolidide and a boric acid trisamide of the general formula

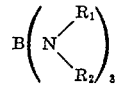

wherein the radicals $R_1$ and $R_2$ represent members selected from the group consisting of unsubstituted, nitro-substituted and alkoxy-substituted aliphatic, cycloaliphatic and aromatic hydrocarbon radicals containing up to 20 carbon atoms.

2. A process as defined in claim 1 wherein the boric acid tris-amide is boric acid tris-diethylamide.

3. A process as defined in claim 1 wherein the boric acid tris-amide is boric acid tris-N-methyl-stearylamide.

4. A process as defined in claim 1 wherein the boric acid tris-amide is boric acid tris-pyrrolidide.

5. A process as claimed in claim 1, wherein the polymerization is carried out at a temperature within the range of $0°$ C. to $40°$ C.

6. A process as claimed in claim 1, wherein formaldehyde is polymerized in admixture with 0.001 to 0.01 mole percent per mole of the monomeric formaldehyde of a boric acid trisamide.

7. A process as claimed in claim 1, wherein formaldehyde is polymerized in admixture with an inert organic solvent in an amount within the range of 2 to 50 times the weight of the resulting polymer.

References Cited in the file of this patent
UNITED STATES PATENTS 2,844,561   Bechtold _____ July 22, 1958
2,989,511   Schnizer _____ June 20, 1961

OTHER REFERENCES

Kern et al.: International Symposium on Macromolecular Chemistry, June 14–18, 1960, Moscow, U.S.S.R. papers, Summaries, Section II, pages 280–285 (pages 282–283 relied on).